(12) United States Patent
Uchiyama et al.

(10) Patent No.: US 12,286,913 B2
(45) Date of Patent: Apr. 29, 2025

(54) WORK MACHINE INCLUDING EXHAUST TREATMENT DEVICES

(71) Applicant: KOMATSU LTD., Tokyo (JP)

(72) Inventors: Kou Uchiyama, Tokyo (JP); Yoshiaki Shimada, Tokyo (JP); Wataru Nishiyama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/021,910

(22) PCT Filed: Aug. 5, 2021

(86) PCT No.: PCT/JP2021/029113
§ 371 (c)(1),
(2) Date: Sep. 1, 2023

(87) PCT Pub. No.: WO2022/049992
PCT Pub. Date: Mar. 10, 2022

(65) Prior Publication Data
US 2024/0200485 A1    Jun. 20, 2024

(30) Foreign Application Priority Data
Sep. 4, 2020   (JP) ................................. 2020-149376

(51) Int. Cl.
*F01N 13/18* (2010.01)
*B60K 13/04* (2006.01)
(Continued)

(52) U.S. Cl.
CPC .......... *F01N 13/1805* (2013.01); *B60K 13/04* (2013.01); *E02F 9/0866* (2013.01); *F01N 13/009* (2014.06); *F01N 2590/08* (2013.01)

(58) Field of Classification Search
CPC ............... F01N 13/009; F01N 13/1805; F01N 2590/08; B60K 13/04; E02F 9/0866
See application file for complete search history.

(56) References Cited

U.S. PATENT DOCUMENTS

| 8,820,468 | B2 * | 9/2014 | Sekiya | ...................... B60R 3/00 60/272 |
| 8,979,125 | B2 * | 3/2015 | Sato | ......................... E02F 9/18 180/196 |

(Continued)

FOREIGN PATENT DOCUMENTS

| DE | 102008017751 | A1 | 11/2008 |
| DE | 102016105888 | A1 * | 10/2017 |

(Continued)

*Primary Examiner* — Audrey B. Walter
(74) *Attorney, Agent, or Firm* — Faegre Drinker Biddle & Reath LLP

(57) ABSTRACT

A work machine where a plurality of exhaust treatment devices can appropriately be arranged is provided. The work machine includes an engine, a first exhaust treatment device that treats exhaust emitted from the engine, and a second exhaust treatment device that treats exhaust that has passed through the first exhaust treatment device. A longitudinal direction of the first exhaust treatment device is inclined with respect to a fore/aft direction and a lateral direction and inclined with respect to a longitudinal direction of the second exhaust treatment device.

7 Claims, 8 Drawing Sheets

(51) Int. Cl.
*E02F 9/08* (2006.01)
*F01N 13/00* (2010.01)

(56) References Cited

U.S. PATENT DOCUMENTS

| | | | |
|---|---|---|---|
| 2009/0019841 A1* | 1/2009 | Fujita | F01N 3/10 60/299 |
| 2012/0138379 A1 | 6/2012 | Tsuji et al. | |
| 2013/0259760 A1* | 10/2013 | Kobayashi | F01N 13/0093 422/168 |
| 2013/0319787 A1* | 12/2013 | Kobayashi | B60K 13/04 180/309 |
| 2015/0135686 A1 | 5/2015 | Hasegawa et al. | |
| 2015/0211209 A1 | 7/2015 | Okuda et al. | |
| 2015/0345360 A1 | 12/2015 | Himoto et al. | |
| 2016/0137054 A1* | 5/2016 | Ueta | F01N 13/18 180/309 |
| 2017/0051472 A1 | 2/2017 | Mochimaru | |
| 2017/0284059 A1 | 10/2017 | Takeyama et al. | |

FOREIGN PATENT DOCUMENTS

| | | |
|---|---|---|
| JP | 2008-196315 A | 8/2008 |
| JP | 2011-021496 A | 2/2011 |
| JP | 2012-30736 A | 2/2012 |
| JP | 2014-074339 A | 4/2014 |
| JP | 2014-080906 A | 5/2014 |
| JP | 2014-224428 A | 12/2014 |
| JP | 2015-098791 A | 5/2015 |
| JP | 2016-94168 A | 5/2016 |
| JP | 2016-125233 A | 7/2016 |
| JP | 5948894 B2 | 7/2016 |
| JP | 2016-138370 A | 8/2016 |
| JP | 2016-176291 A | 10/2016 |
| JP | 2020-054241 A | 4/2020 |
| KR | 10-1554919 B | 9/2015 |
| WO | WO-2016/002973 A1 | 1/2016 |

\* cited by examiner

WORK MACHINE INCLUDING EXHAUST TREATMENT DEVICES

TECHNICAL FIELD

The present disclosure relates to a work machine.

BACKGROUND ART

WO2016/002973 (PTL 1) discloses a short tail swing radius hydraulic excavator including an exhaust treatment unit including a diesel particulate filter device and a selective catalytic reduction device.

CITATION LIST

Patent Literature

PTL 1: WO2016/002973

SUMMARY OF INVENTION

Technical Problem

In a work machine including a plurality of exhaust treatment devices for complying with emission control regulations, appropriate arrangement of these exhaust treatment devices on a vehicular body frame limited in area has been demanded.

The present disclosure proposes a work machine where a plurality of exhaust treatment devices can appropriately be arranged.

Solution to Problem

According to the present disclosure, a work machine including an engine, a first exhaust treatment device that treats exhaust emitted from the engine, and a second exhaust treatment device that treats exhaust that has passed through the first exhaust treatment device is proposed. A longitudinal direction of the first exhaust treatment device is inclined with respect to a fore/aft direction and a lateral direction and inclined with respect to a longitudinal direction of the second exhaust treatment device.

Advantageous Effects of Invention

According to the work machine in the present disclosure, a plurality of exhaust treatment devices can appropriately be arranged.

DESCRIPTION OF EMBODIMENTS

Figure 1:
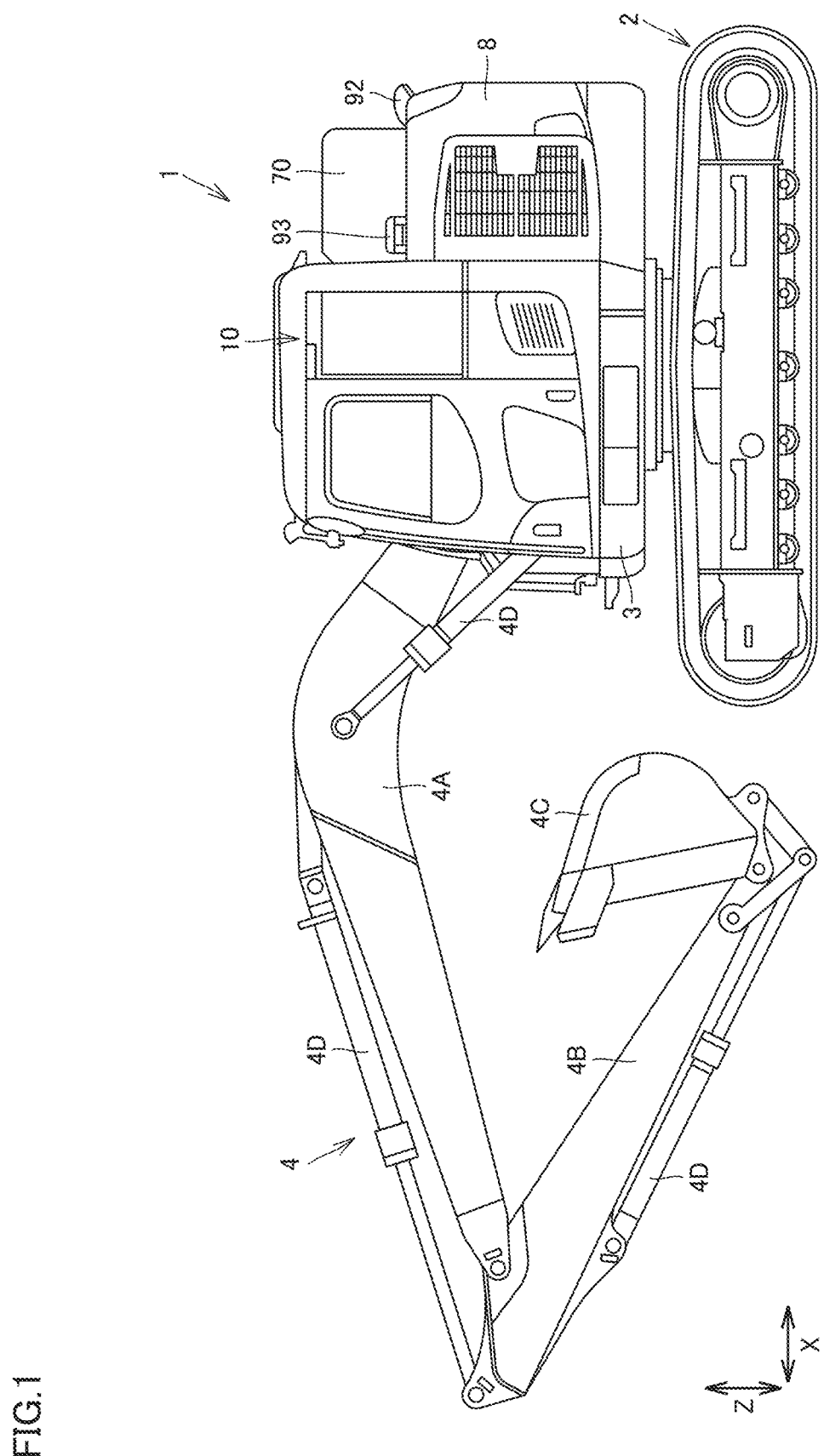
FIG. 1 is a left side view schematically showing a construction of a hydraulic excavator based on an embodiment.

An embodiment will be described hereinafter with reference to the drawings. In the description below, the same elements have the same reference characters allotted and their labels and functions are also the same. Therefore, detailed description thereof will not be repeated.

In the embodiment, a short tail swing radius hydraulic excavator will be described by way of example of a work machine. The short tail swing radius hydraulic excavator can fully revolve with a slewing radius of a rear end of a revolving unit being within 120% of the total width of a travel unit in order to secure safety in the rear of a vehicular body during slewing, although it fully revolves with a front minimal slewing radius exceeding 120% thereof (see the definition under Japanese Industrial Standards (JIS A 8340-4)). A concept of the embodiment can also be applied to work machines of other types.

FIG. 1 is a left side view schematically showing a construction of a hydraulic excavator 1 based on the embodiment. As shown in FIG. 1, hydraulic excavator 1 in the present embodiment mainly includes a travel unit 2, a revolving unit 3, and a work implement 4. Travel unit 2 and revolving unit 3 constitute a vehicular body of hydraulic excavator 1.

Travel unit 2 has a pair of left and right crawler belts. Hydraulic excavator 1 is constructed to be self-propelled as the pair of left and right crawler belts is driven to rotate. Revolving unit 3 is mounted on travel unit 2. Revolving unit 3 is provided as being revolvable with respect to travel unit 2 with a swing circle portion being interposed.

Revolving unit 3 includes a cab 10. Cab 10 is arranged in a front left portion of revolving unit 3 (a front portion of the vehicle). Cab 10 is carried on the vehicular body of hydraulic excavator 1. In the inside of cab 10, an operator's room is provided. The operator's room is a space for an operator to operate hydraulic excavator 1. In the operator's room, an operator's seat where the operator sits is arranged.

Work implement 4 serves for such work as excavation of soil. Work implement 4 includes a boom 4A, an arm 4B, a bucket 4C, and hydraulic cylinders 4D. Boom 4A has a base end portion attached to revolving unit 3 as being rotatable around a boom pin in both directions with respect to revolving unit 3. Arm 4B has a base end portion attached to a tip end portion of boom 4A as being rotatable around an arm pin in both directions with respect to boom 4A. Bucket 4C is attached to a tip end portion of arm 4B as being rotatable around a bucket pin in both directions with respect to arm 4B. Work implement 4 can be driven as each of boom 4A, arm 4B, and bucket 4C is driven by hydraulic cylinders 4D.

In the present embodiment, positional relation of portions of hydraulic excavator 1 will be described with work implement 4 being defined as the reference.

Boom 4A of work implement 4 rotationally moves with respect to revolving unit 3 around the boom pin. A trace of movement of a specific portion of boom 4A that pivots with respect to revolving unit 3 such as the tip end portion of boom 4A is in an arc shape, and a plane including the arc is specified. When hydraulic excavator 1 is viewed in a plan view, the plane is represented as a straight line. A direction in which this straight line extends is a fore/aft direction of the vehicular main body or a fore/aft direction of revolving unit 3, and it will also simply be referred to as the fore/aft direction below. A lateral direction (a direction of vehicle width) of the vehicular main body or a lateral direction of revolving unit 3 is a direction orthogonal to the fore/aft direction in the plan view, and it will also simply be referred to as the lateral direction below. The lateral direction refers to a direction in which the boom pin extends. An upward/downward direction of the vehicular main body or an upward/downward direction of revolving unit 3 is a direction orthogonal to the plane defined by the fore/aft direction and the lateral direction, and it will also simply be referred to as an upward/downward direction below.

In the fore/aft direction, a side toward which work implement 4 projects from the vehicular main body is the fore direction and a direction opposite to the fore direction is the aft direction. A right side and a left side in the lateral direction when facing front are a right direction and a left direction, respectively. A side where the ground is located in the upward/downward direction is a lower side and a side where the sky is located is an upper side.

The fore/aft direction refers to the fore/aft direction of an operator who sits in the operator's seat in cab 10. The lateral direction refers to the lateral direction of the operator who sits in the operator's seat. The upward/downward direction refers to the upward/downward direction of the operator who sits in the operator's seat. A direction in which the operator sitting in the operator's seat faces is defined as the fore direction and a direction behind the operator sitting in the operator's seat is defined as the aft direction. A right side and a left side at the time when the operator sitting in the operator's seat faces front are defined as the right direction and the left direction, respectively. A foot side of the operator who sits in the operator's seat is defined as a lower side, and a head side is defined as an upper side.

In FIG. 1 and subsequent figures, a fore/aft direction X, a lateral direction Y, and an upward/downward direction Z are each shown with a double-headed arrow.

Work implement 4 is attached to a front portion of revolving unit 3. Work implement 4 is arranged on the right of cab 10. Arrangement of cab 10 and work implement 4 is not limited to that in this example, and work implement 4 may be arranged on the left of cab 10 arranged in a front right portion of revolving unit 3.

Figure 2:
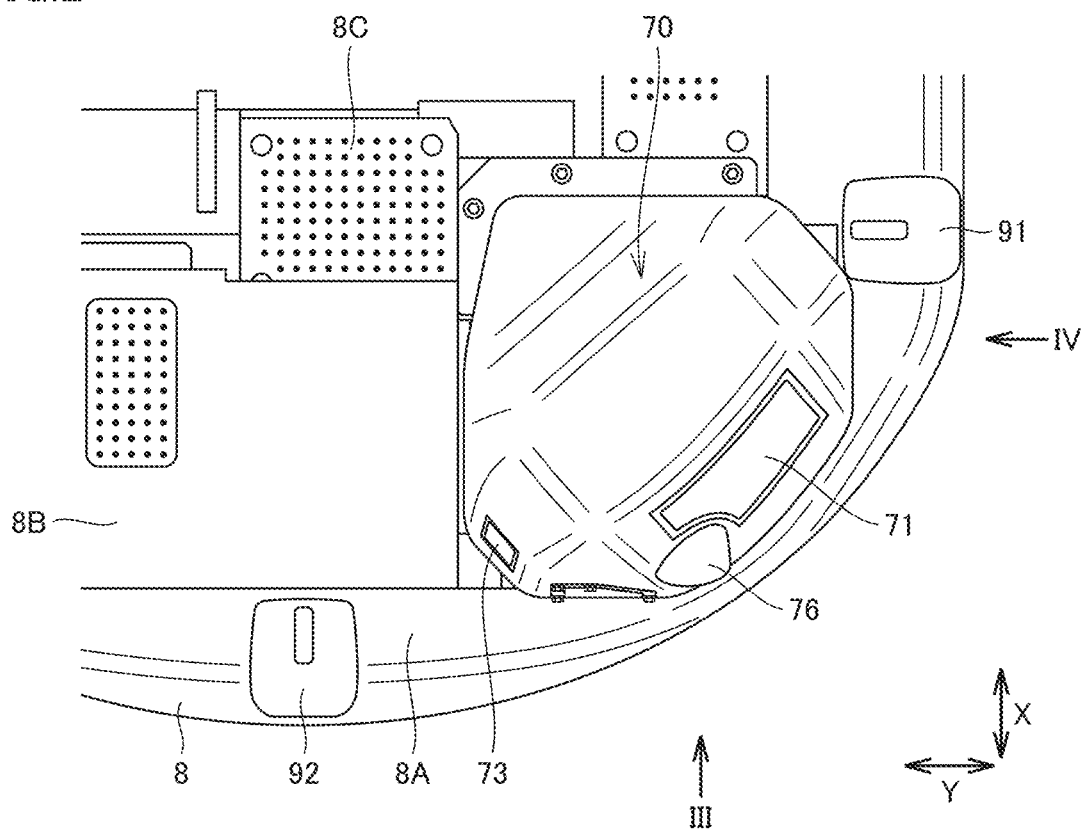
FIG. 2 is a plan view showing as being enlarged, a rear right portion of a vehicular body of the hydraulic excavator shown in FIG. 1.
Figure 3:
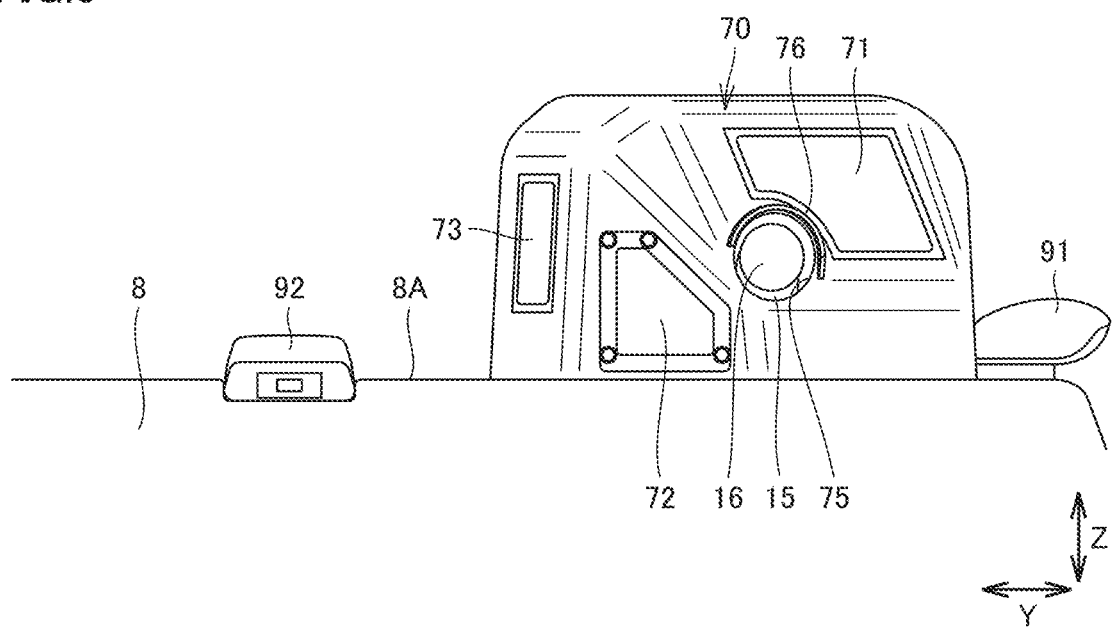
FIG. 3 is a rear view of the rear right portion of the vehicular body of the hydraulic excavator in a direction shown with an arrow III in FIG. 2.
Figure 4:
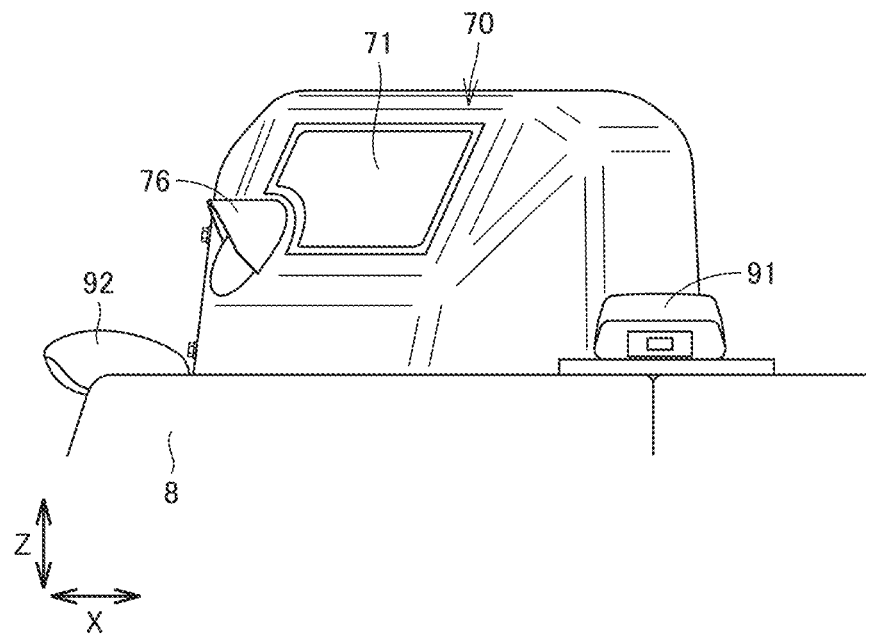
FIG. 4 is a right side view of the rear right portion of the vehicular body of the hydraulic excavator in a direction shown with an arrow IV in FIG. 2.

FIG. 2 is a plan view showing as being enlarged, a rear right portion of the vehicular body of hydraulic excavator 1 shown in FIG. 1. FIG. 3 is a rear view of the rear right portion of the vehicular body of hydraulic excavator 1 in a direction shown with an arrow III in FIG. 2. FIG. 4 is a right side view of the rear right portion of the vehicular body of hydraulic excavator 1 in a direction shown with an arrow IV in FIG. 2.

As shown in FIGS. 1 and 2 to 4, revolving unit 3 includes a vehicular body cover 8. Vehicular body cover 8 includes a top plate 8A that forms an upper surface of revolving unit 3. An engine which is a drive source of hydraulic excavator 1 is mounted on revolving unit 3. An engine compartment where the engine is accommodated is provided on revolving unit 3. Vehicular body cover 8 includes an engine hood 8B that covers the engine compartment at least from above. Vehicular body cover 8 includes a foothold 8C on which a worker steps for maintenance works.

As shown in FIGS. 1 and 2 to 4, a right camera 91, a rear camera 92, and a left camera 93 are attached to vehicular body cover 8. Right camera 91 faces to the right and picks up an image of topography and an obstacle on the right of hydraulic excavator 1. Rear camera 92 faces rearward and picks up an image of topography and an obstacle in the rear of hydraulic excavator 1. Left camera 93 faces to the left and picks up an image of topography and an obstacle on the left of hydraulic excavator 1.

An exhaust treatment cover 70 is attached to top plate 8A of vehicular body cover 8. Exhaust treatment cover 70 is arranged on an upper side of top plate 8A of vehicular body cover 8. Exhaust treatment cover 70 protrudes upward from top plate 8A of vehicular body cover 8. An exhaust treatment device that treats exhaust from the engine for complying with the emission control regulations is covered with exhaust treatment cover 70 at least from above.

An exhaust opening 75 is provided in exhaust treatment cover 70. An exhaust pipe 15 through which exhaust from the engine that has passed through the exhaust treatment device flows includes an exhaust port 16 from which exhaust is emitted to the atmosphere. Exhaust port 16 is exposed through exhaust treatment cover 70 through exhaust opening 75. Exhaust opening 75 is an annular opening and a canopy portion 76 is provided at an upper edge of exhaust opening 75. Canopy portion 76 protects exhaust pipe 15 and suppresses entry of moisture into exhaust pipe 15 through exhaust port 16. Exhaust opening 75 is provided in a rear surface of exhaust treatment cover 70. Exhaust opening 75 is arranged below a height position of an upper surface of exhaust treatment cover 70. Exhaust port 16 is arranged below the height position of the upper surface of exhaust treatment cover 70.

Exhaust treatment cover 70 is provided with a plurality of ventilating openings 71 to 73 which are openings different from exhaust opening 75. Ventilating opening 71 opens to the rear right. Ventilating opening 72 opens rearward. Ventilating opening 73 opens to the rear left. Ventilating openings 71 to 73 open toward edge portions of revolving unit 3. Ventilating openings 71 to 73 do not open in a direction toward cab 10. Ventilating openings 71 to 73 do not open in a direction toward foothold 8C.

Figure 5:
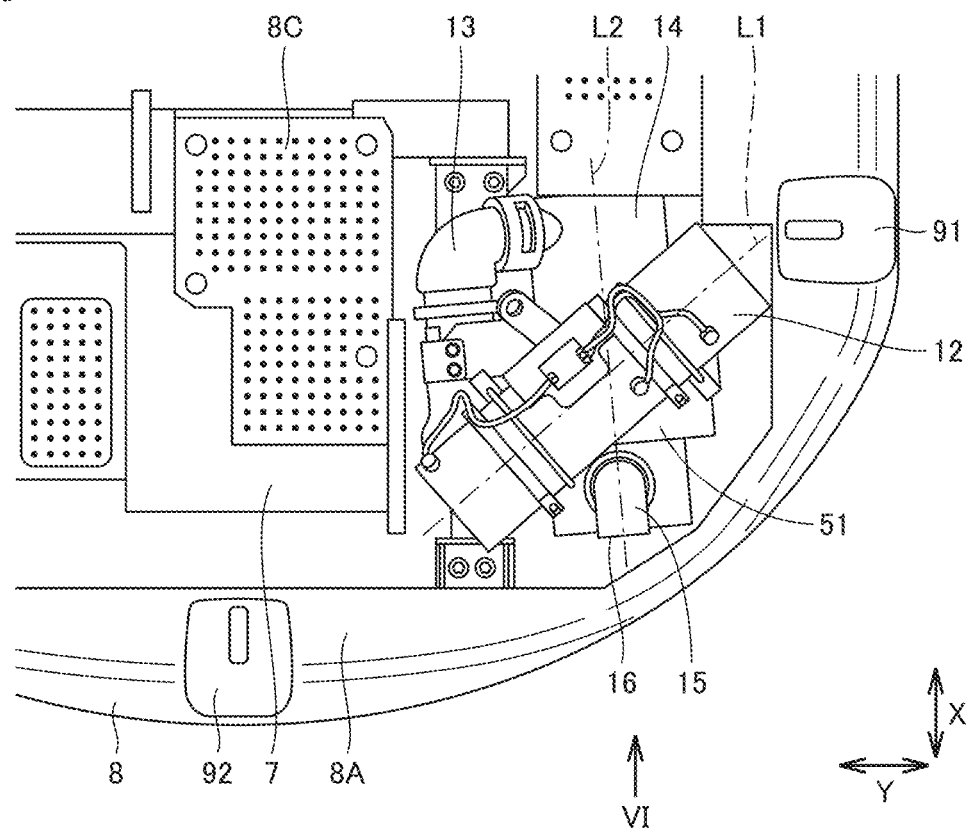
FIG. 5 is a plan view of the rear right portion of the vehicular body of the hydraulic excavator from which an engine hood and an exhaust treatment cover were removed.
Figure 6:
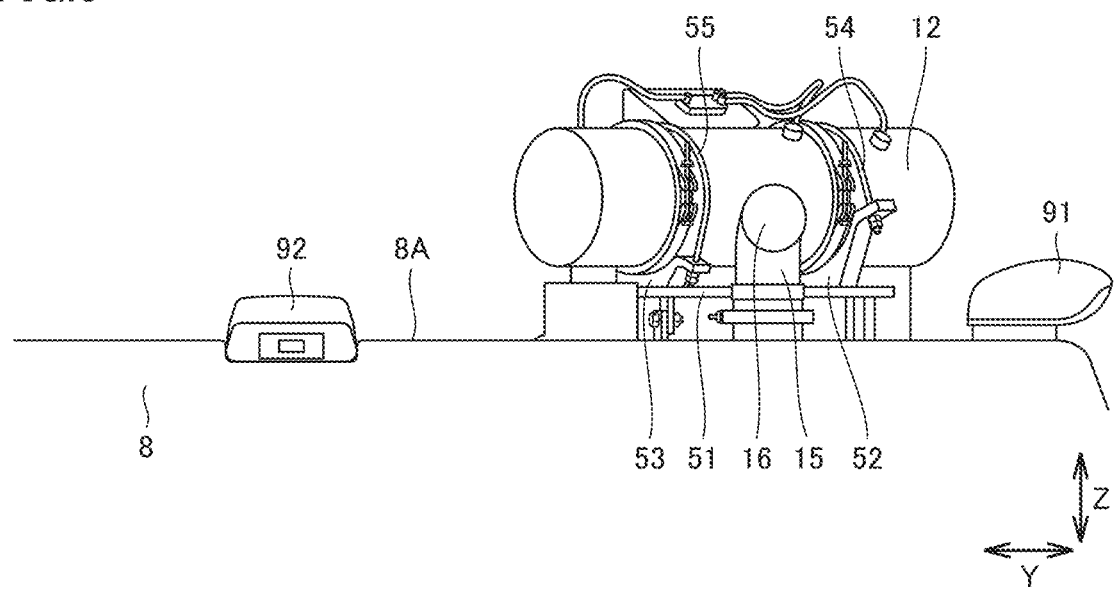
FIG. 6 is a rear view of the rear right portion of the vehicular body of the hydraulic excavator in a direction shown with an arrow VI in FIG. 5.

FIG. 5 is a plan view of the rear right portion of the vehicular body of hydraulic excavator 1 from which engine hood 8B and exhaust treatment cover 70 were removed. FIG. 6 is a rear view of the rear right portion of the vehicular body of hydraulic excavator 1 in a direction shown with an arrow VI in FIG. 5.

Engine 7 is a motive power source for driving travel unit 2 and work implement 4. Engine 7 is accommodated in the engine compartment below engine hood 8B. Since engine 7 is large in weight, it is arranged in the rear of revolving unit 3 in consideration of weight balance with work implement 4.

Exhaust from engine 7 is treated by a first exhaust treatment device 12 and a second exhaust treatment device 14. First exhaust treatment device 12 is constructed to treat exhaust emitted from engine 7. Second exhaust treatment device 14 is constructed to treat exhaust that has passed through first exhaust treatment device 12.

For example, a diesel particulate filter device is employed as first exhaust treatment device 12. The diesel particulate filter device mainly has a filter. The diesel particulate filter device collects particulate matters contained in exhaust from engine 7 with the filter. The filter is made, for example, of ceramics. With this diesel particulate filter device, a concentration of the particulate matters in exhaust can be lowered.

For example, a selective catalytic reduction device is employed as second exhaust treatment device 14. The selective catalytic reduction device lowers a concentration of nitrogen oxide in exhaust, for example, by reducing nitrogen oxide contained in exhaust through reaction with a reducing agent and chemically changing nitrogen oxide into harmless nitrogen gas. The selective catalytic reduction device is a device treating exhaust from engine 7 and serves to reduce nitrogen oxide $NO_x$ by hydrolyzing a urea solution as the reducing agent. The selective catalytic reduction device applies, in principle, reduction of ammonia ($NH_3$) to nitrogen ($N_2$) and water ($H_2O$) as a result of chemical reaction with nitrogen oxide ($NO_x$).

Ammonia is not loaded on hydraulic excavator 1, but for example, a reducing agent tank containing a urea solution is mounted on hydraulic excavator 1 as the reducing agent tank. For example, the urea solution is suitably used as the reducing agent, however, the reducing agent is not limited thereto, and anything which can reduce nitrogen oxide $NO_x$ is acceptable.

A reducing agent and a precursor of the reducing agent are herein collectively referred to as a "reducing agent". A diesel oxidation catalyst device may be employed as first exhaust treatment device 12, and any combination of the diesel particulate filter device, the diesel oxidation catalyst device, and the selective catalytic reduction device may be employed as first exhaust treatment device 12 and second exhaust treatment device 14.

First exhaust treatment device 12 and second exhaust treatment device 14 are arranged on a lateral side of engine 7, for example, on the right of engine 7. First exhaust treatment device 12 is connected to second exhaust treatment device 14 through an intermediate pipe 13. Intermediate pipe 13 is constructed to guide exhaust that has passed through first exhaust treatment device 12 to second exhaust treatment device 14.

Exhaust pipe 15 is connected to second exhaust treatment device 14. Exhaust pipe 15 is connected to an upper surface of second exhaust treatment device 14 and extends upward from second exhaust treatment device 14. Exhaust pipe 15 extends in upward/downward direction Z. Exhaust that has passed through second exhaust treatment device 14 flows upward from below through exhaust pipe 15. Exhaust pipe 15 includes exhaust port 16 from which exhaust is emitted to the atmosphere. Exhaust port 16 opens to the rear of hydraulic excavator 1. Therefore, exhaust is emitted from exhaust port 16 toward the rear of hydraulic excavator 1.

Exhaust port 16 is provided at an upper end of exhaust pipe 15. Exhaust port 16 opens on a lateral side of first exhaust treatment device 12. In upward/downward direction Z, exhaust port 16 is arranged at a position superimposed on first exhaust treatment device 12. Exhaust port 16 is located at a position below the height position of an upper surface of first exhaust treatment device 12. Exhaust port 16 is located at a position higher than the height position of the upper surface of second exhaust treatment device 14. Exhaust port 16 is located at a position higher than the height position of top plate 8A of vehicular body cover 8.

First exhaust treatment device 12 is arranged above second exhaust treatment device 14. First exhaust treatment device 12 is arranged above top plate 8A of vehicular body cover 8. Referring to FIGS. 2 to 4 together, first exhaust treatment device 12 is covered with exhaust treatment cover 70 from above and from lateral sides. Second exhaust treatment device 14 is arranged below top plate 8A of vehicular body cover 8.

An axial line L1 shown with a chain dotted line in FIG. 5 represents a longitudinal direction of first exhaust treatment device 12. First exhaust treatment device 12 has a geometry substantially in a shape of a cylinder and axial line L1 corresponds to a centerline of the cylinder.

The longitudinal direction of first exhaust treatment device 12 shown with axial line L1 is inclined with respect to fore/aft direction X and lateral direction Y of hydraulic excavator 1. A direction of flow of exhaust in first exhaust treatment device 12 is a direction from the front toward the rear. First exhaust treatment device 12 is arranged as being inclined such that an upstream end of the flow of exhaust is located ahead of a downstream end and the upstream end of the flow of exhaust is located on the right of the downstream end.

An axial line L2 shown with a chain dotted line in FIG. 5 represents the longitudinal direction of second exhaust treatment device 14. Second exhaust treatment device 14 has a geometry substantially in a shape of a cylinder and axial line L2 corresponds to a centerline of the cylinder.

The longitudinal direction of second exhaust treatment device 14 shown with axial line L2 is inclined with respect to fore/aft direction X and lateral direction Y of hydraulic excavator 1. A direction of flow of exhaust in second exhaust treatment device 14 is a direction from the front toward the rear. Second exhaust treatment device 14 is arranged as being inclined such that the upstream end of the flow of exhaust is located ahead of the downstream end and the upstream end of the flow of exhaust is located on the left of the downstream end.

The longitudinal direction of first exhaust treatment device 12 is inclined with respect to the longitudinal direction of second exhaust treatment device 14. The longitudinal direction of first exhaust treatment device 12 is not in parallel to the longitudinal direction of second exhaust treatment device 14. In the plan view shown in FIG. 5, first exhaust treatment device 12 and second exhaust treatment device 14 intersect with each other. The plan view means a view downward from above along upward/downward direction Z as shown in FIG. 5. In the plan view, first exhaust treatment device 12 and second exhaust treatment device 14 are superimposed on each other.

Foothold 8C is arranged to cover a part of engine 7 from above. A worker can do maintenance works for engine 7 by stepping on foothold 8C and accessing engine 7. Foothold 8C is arranged on the lateral side of first exhaust treatment device 12, specifically, on the left of first exhaust treatment device 12. The worker can do maintenance works for first exhaust treatment device 12 such as cleaning or replacement of a filter, by stepping on foothold 8C and accessing first exhaust treatment device 12.

Figure 7:
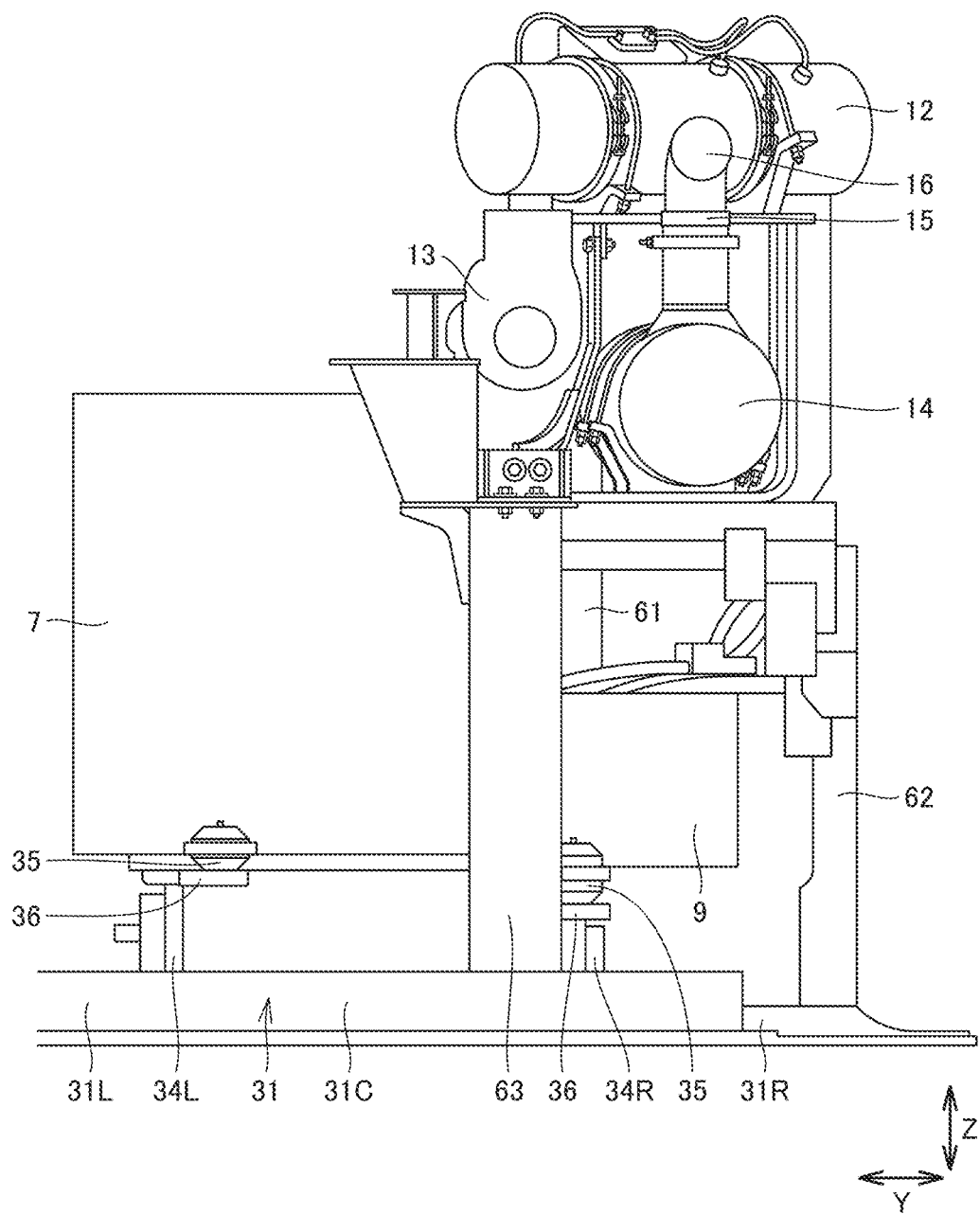
FIG. 7 is a rear view of a support structure for an exhaust treatment device.
Figure 8:
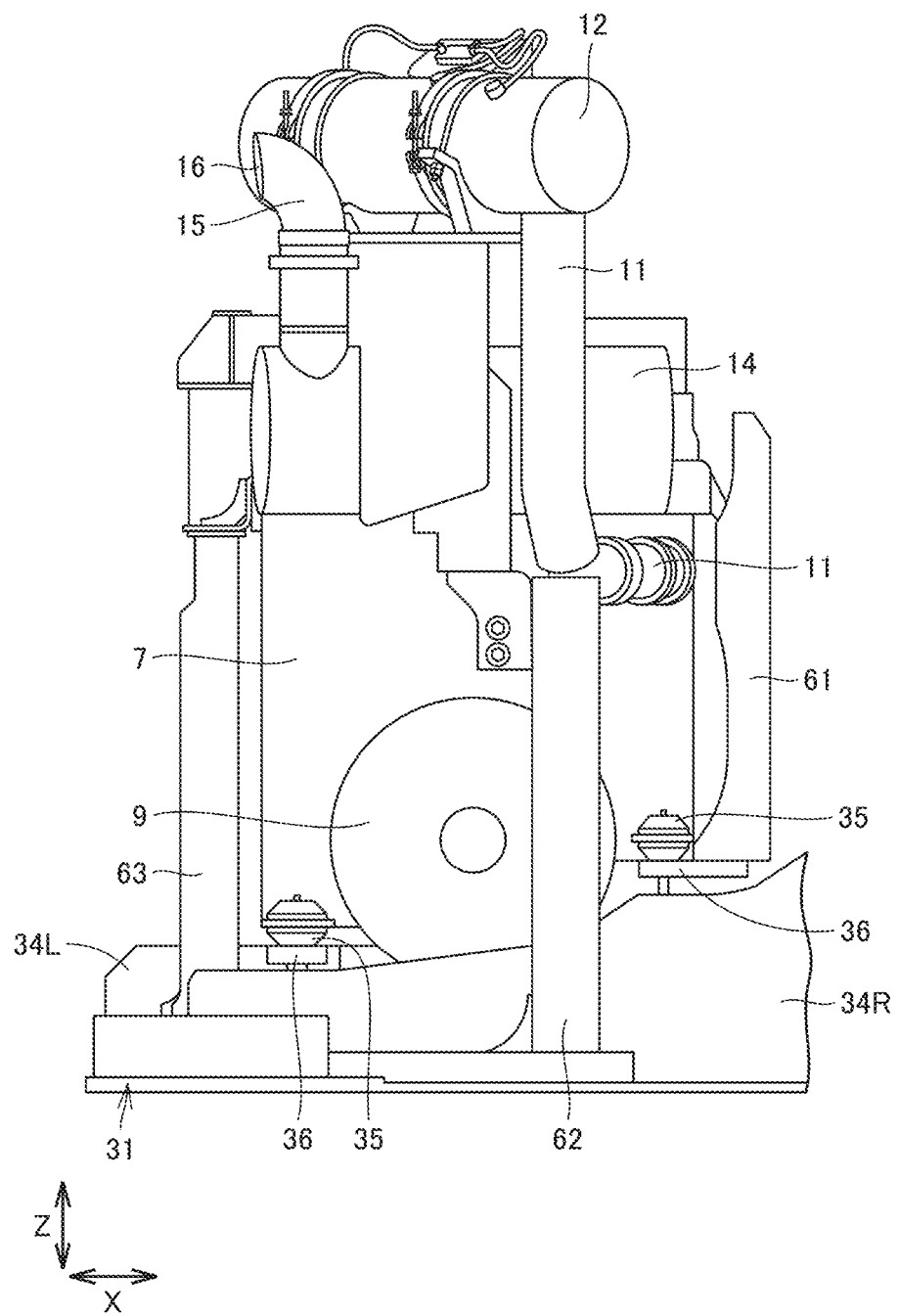
FIG. 8 is a right side view of the support structure for the exhaust treatment device.

FIG. 7 is a rear view of a support structure for the exhaust treatment device. FIG. 8 is a right side view of the support structure for the exhaust treatment device. FIG. 7 shows the exhaust treatment device and the support structure therefor viewed from the rear. FIG. 8 shows the exhaust treatment device and the support structure therefor viewed from the right.

Hydraulic excavator 1 includes a revolution frame 31. Engine 7 and the exhaust treatment device are arranged above revolution frame 31 and supported by revolution frame 31. In a plan view, revolution frame 31 has a rear edge formed in an arc shape around a revolution center of revolving unit 3. Various devices such as engine 7 and the exhaust treatment device mounted on revolution frame 31 are arranged within revolution frame 31 in the arc shape to thereby implement short tail swing radius hydraulic excavator 1 small in slewing radius of the rear surface.

Referring to FIG. 2 together, vehicular body cover 8 covering engine 7 also has a rear edge formed in the arc shape. Referring again to FIG. 5, first exhaust treatment device 12 is arranged such that the longitudinal direction thereof extends along the arc shape of the rear edge of revolution frame 31 (the rear edge of vehicular body cover 8).

Revolution frame 31 includes a pair of vertical plates 34L and 34R. Vertical plates 34L and 34R are located in a central portion of revolution frame 31 in lateral direction Y. Vertical plates 34L and 34R are each formed from a plate material extending in fore/aft direction X and upward/downward direction Z and rising upward. The pair of vertical plates 34L and 34R is arranged at a distance from each other in lateral direction Y. Vertical plate 34L is arranged on the left of vertical plate 34R at a distance from vertical plate 34R. Vertical plate 34R is arranged on the right of vertical plate 34L at a distance from vertical plate 34L. Work implement 4 (FIG. 1) is supported at front end portions of the pair of vertical plates 34L and 34R as being rotatable relative to vertical plates 34L and 34R.

Revolution frame 31 includes a center frame 31C between the pair of vertical plates 34L and 34R in lateral direction Y, a left side frame 31L on the left of vertical plate 34L in lateral direction Y, and a right side frame 31R on the right of vertical plate 34R in lateral direction Y. Left side frame 31L is arranged on the left of center frame 31C. Right side frame 31R is arranged on the right of center frame 31C. Center frame 31C, left side frame 31L, and right side frame 31R are integrally formed.

A plurality of engine mount support portions 36 are attached to vertical plates 34L and 34R as being integrated therewith, for example, by welding. Engine 7 is mounted on each engine mount support portion 36 with an engine mount 35 being interposed and supported above revolution frame 31. By providing engine mount support portions 36 in vertical plates 34L and 34R high in strength, engine 7 large in weight can be supported on revolution frame 31. Engine 7 is arranged substantially between vertical plates 34L and 34R.

A hydraulic pump 9 is arranged on the right of engine 7. Hydraulic pump 9 is arranged on the right of vertical plate 34R. Hydraulic pump 9 is coupled to an output shaft of engine 7 and activated upon receiving motive power from engine 7. Hydraulic pump 9 supplies hydraulic oil to various actuators such as hydraulic cylinders 4D that drive work implement 4, a travel motor for travel of travel unit 2, and a swing motor that revolves revolving unit 3 with respect to travel unit 2. First exhaust treatment device 12 and second exhaust treatment device 14 are arranged above hydraulic pump 9.

The support structure for supporting first exhaust treatment device 12 and second exhaust treatment device 14 above revolution frame 31 includes three pillar members 61, 62, and 63 and a support frame 40 which will be described later. Pillar members 61, 62, and 63 extend in the upward/downward direction and function as pillars that receive compressive loads in a direction in which they extend. Pillar members 61, 62, and 63 support first exhaust treatment device 12 and second exhaust treatment device 14 at three portions on revolution frame 31. First exhaust treatment device 12 and second exhaust treatment device 14 large in weight are thus securely supported above revolution frame 31.

Pillar member 61 is supported on vertical plate 34R with engine mount support portion 36 being interposed. Engine mount support portion 36 that protrudes to the left from vertical plate 34R is formed as being integrated with vertical plate 34R and pillar member 61 has a lower end attached to engine mount support portion 36. Pillar member 62 has a lower end attached to right side frame 31R. Pillar member 62 is arranged at a distance from vertical plate 34R toward the right. Pillar member 63 has a lower end attached to center frame 31C at a position immediately on the left of vertical plate 34R. Pillar member 63 is arranged between the pair of vertical plates 34L and 34R and arranged in the vicinity of the rear edge of revolution frame 31.

Pillar member 61, pillar member 62, and pillar member 63 are arranged in this order from the front toward the rear in fore/aft direction X. Pillar member 62, pillar member 61, and pillar member 63 are arranged in this order from the right to the left in lateral direction Y. Pillar members 61, 62, and 63 are fixed to revolution frame 31 with a fastening member represented, for example, by a bolt.

Figure 9:
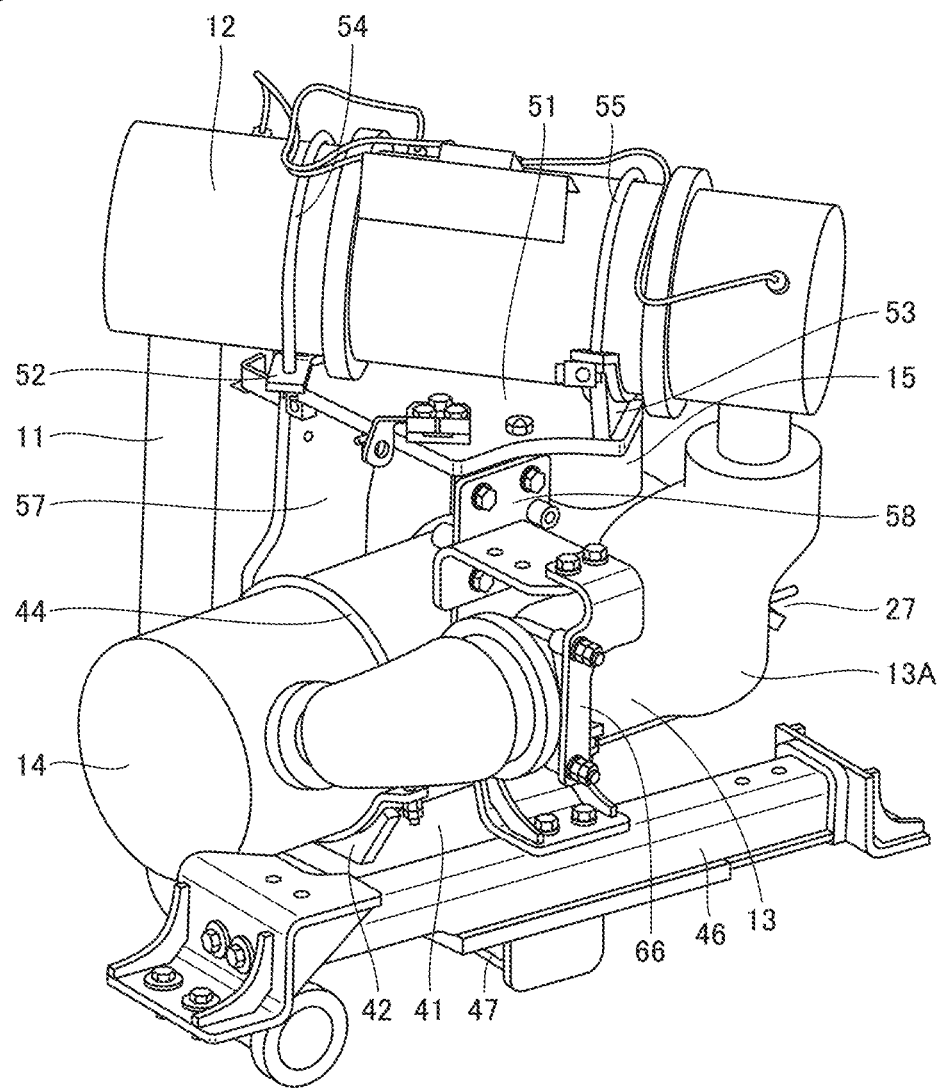
FIG. 9 is a perspective view showing the exhaust treatment device mounted on a support frame.
Figure 10:
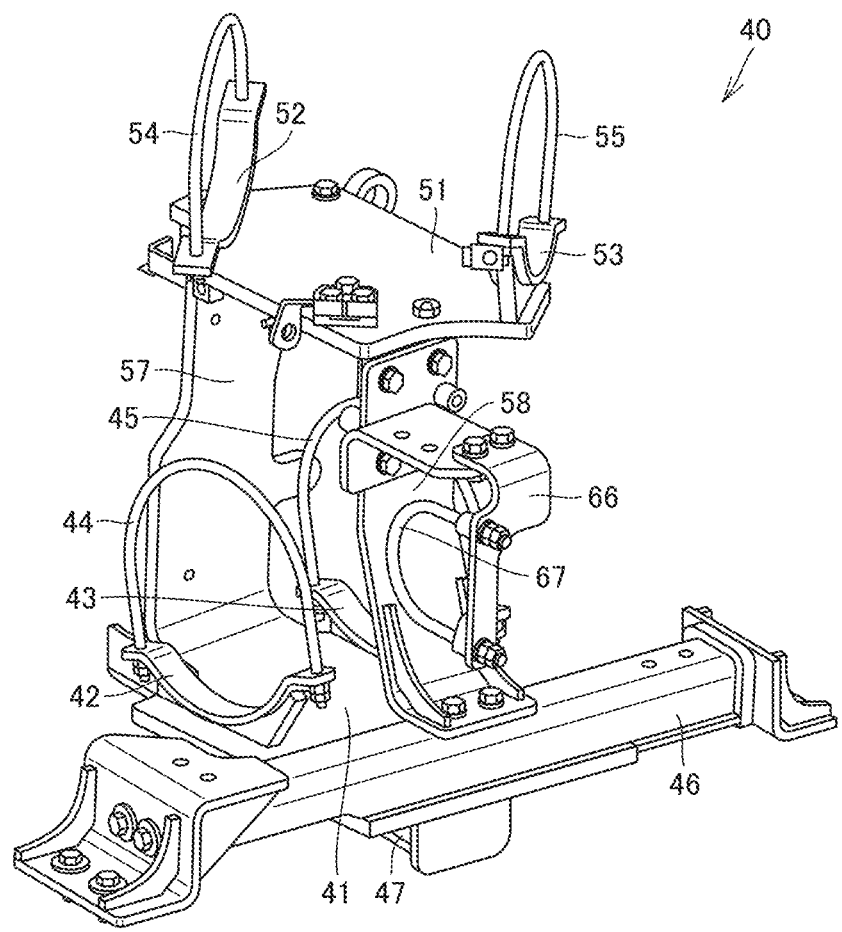
FIG. 10 is a perspective view of the support frame.

FIG. 9 is a perspective view showing first exhaust treatment device 12 and second exhaust treatment device 14 mounted on support frame 40. FIG. 10 is a perspective view of support frame 40. FIG. 10 does not show first exhaust treatment device 12, second exhaust treatment device 14, introduction pipe 11, intermediate pipe 13, and exhaust pipe 15 that are shown in FIG. 9.

Referring to FIGS. 7 and 8 and FIGS. 8 and 9, first exhaust treatment device 12 is connected to engine 7 through introduction pipe 11. Introduction pipe 11 is constructed to guide exhaust emitted from engine 7 to first exhaust treatment device 12. Introduction pipe 11 passes on the lateral side of second exhaust treatment device 14, extends in the upward/downward direction, and is connected to a lower surface of first exhaust treatment device 12. Exhaust from engine 7 flows upward from below within introduction pipe 11 and flows into first exhaust treatment device 12 from below. As shown in FIG. 8, introduction pipe 11 is arranged as being closer to a right edge of revolution frame 31 than second exhaust treatment device 14.

Introduction pipe 11 is connected to one end of first exhaust treatment device 12 in the longitudinal direction. Introduction pipe 11 is connected to an upstream end of first exhaust treatment device 12 in the direction of flow of exhaust. Since the longitudinal direction of first exhaust treatment device 12 is inclined with respect to fore/aft direction X and lateral direction Y, introduction pipe 11 is connected to a front end of first exhaust treatment device 12 in fore/aft direction X and connected to a right end of first exhaust treatment device 12 in lateral direction Y.

Intermediate pipe 13 that guides exhaust that has passed through first exhaust treatment device 12 to second exhaust treatment device 14 is connected to the lower surface of first exhaust treatment device 12 and connected to a side surface of second exhaust treatment device 14.

Intermediate pipe 13 is connected to the other end of first exhaust treatment device 12 in the longitudinal direction. Intermediate pipe 13 is connected to a downstream end of first exhaust treatment device 12 in the direction of flow of exhaust. Since the longitudinal direction of first exhaust treatment device 12 is inclined with respect to fore/aft direction X and lateral direction Y, intermediate pipe 13 is connected to a rear end of first exhaust treatment device 12 in fore/aft direction X and connected to a left end of first exhaust treatment device 12 in lateral direction Y.

Intermediate pipe 13 includes a vertical pipe portion that extends downward from first exhaust treatment device 12 and a lateral pipe portion that is bent at a lower end of the vertical pipe portion and extends along second exhaust treatment device 14. The longitudinal direction of the lateral pipe portion is substantially identical to the longitudinal direction of second exhaust treatment device 14. Referring to FIG. 5 together, intermediate pipe 13 is arranged on the left of second exhaust treatment device 14. Intermediate pipe 13 is arranged closer to engine 7 than second exhaust treatment device 14. Intermediate pipe 13 is arranged at a longer distance from the right edge of revolution frame 31 than second exhaust treatment device 14.

The lateral pipe portion includes a large-diameter portion 13A which is a portion of intermediate pipe 13 increased in diameter, in the vicinity of the upstream end of the flow of exhaust. An injector 27 is attached to large-diameter portion 13A. Injector 27 injects a reducing agent into intermediate pipe 13. Intermediate pipe 13 performs a function as a mixing pipe where the reducing agent is injected and mixed into exhaust. Since injector 27 is connected to an upstream side of intermediate pipe 13, the reducing agent supplied into intermediate pipe 13 is mixed with exhaust before it reaches second exhaust treatment device 14.

Intermediate pipe 13 is connected to one end of second exhaust treatment device 14 in the longitudinal direction. Intermediate pipe 13 is connected to the upstream end of second exhaust treatment device 14 in the direction of flow of exhaust. Since the longitudinal direction of second exhaust treatment device 14 is inclined with respect to fore/aft direction X and lateral direction Y, intermediate pipe 13 is connected to the front end of second exhaust treatment device 14 in fore/aft direction X and connected to the left end of second exhaust treatment device 14 in lateral direction Y. Intermediate pipe 13 is connected to a left surface of second exhaust treatment device 14.

Exhaust pipe 15 is connected to the other end of second exhaust treatment device 14 in the longitudinal direction. Exhaust pipe 15 is connected to a downstream end of second exhaust treatment device 14 in the direction of flow of exhaust. Since the longitudinal direction of second exhaust treatment device 14 is inclined with respect to fore/aft direction X and lateral direction Y, exhaust pipe 15 is connected to the rear end of second exhaust treatment device 14 in fore/aft direction X and connected to a right end of second exhaust treatment device 14 in lateral direction Y. Referring to FIGS. 5 and 6 together, exhaust pipe 15 is arranged on the right of first exhaust treatment device 12 and in the rear of first exhaust treatment device 12. Exhaust pipe 15 is arranged closer to an edge portion of revolution frame 31 than first exhaust treatment device 12.

Support frame 40 shown in FIG. 10 is mounted on three pillar members 61, 62, and 63 described with reference to FIGS. 7 and 8, and fixed to upper ends of pillar members 61, 62, and 63. Support frame 40 is supported on pillar members 61, 62, and 63. First exhaust treatment device 12 and second exhaust treatment device 14 are supported on support frame 40. First exhaust treatment device 12 and second exhaust treatment device 14 are supported on pillar members 61, 62, and 63 with support frame 40 being interposed. Support frame 40 is supported on revolution frame 31 with pillar members 61, 62, and 63 being interposed. First exhaust treatment device 12 and second exhaust treatment device 14 are supported on revolution frame 31 by the support structure including support frame 40 and pillar members 61, 62, and 63.

Support frame 40 mainly includes a first floor portion 41, beam portions 46 and 47, a second floor portion 51, wall members 57 and 58, and an intermediate pipe support portion 66.

First floor portion 41 forms a first-tier portion of support frame 40. First floor portion 41 is arranged above hydraulic pump 9. Of first exhaust treatment device 12 and second exhaust treatment device 14, second exhaust treatment device 14 arranged below is mounted on first floor portion 41. First floor portion 41 is generally in a shape like a flat plate and extends substantially horizontally. Referring to FIG. 6, first floor portion 41 is arranged at a position lower than top plate 8A of vehicular body cover 8.

A pair of support brackets 42 and 43 are attached to an upper surface of first floor portion 41. Support brackets 42 and 43 are aligned in the longitudinal direction of second exhaust treatment device 14 and arranged at a distance from each other. An attachment instrument 44 is attached to support bracket 42 and an attachment instrument 45 is attached to support bracket 43. For example, a U-bolt is adopted as attachment instruments 44 and 45.

As shown in FIG. 9, second exhaust treatment device 14 is mounted on the pair of support brackets 42 and 43. In this state, attachment instrument 44 substantially in the U shape surrounds the upper surface and the side surface of cylindrical second exhaust treatment device 14 and opposing ends of attachment instrument 44 are fixed to support bracket 42, and attachment instrument 45 substantially in the U shape surrounds the upper surface and the side surface of second exhaust treatment device 14 and opposing ends of attachment instrument 45 are fixed to support bracket 43. Second exhaust treatment device 14 is thus carried on first floor portion 41 and supported by first floor portion 41 from below.

Second floor portion 51 forms a second-tier portion of support frame 40. Second floor portion 51 is arranged above first floor portion 41. Second floor portion 51 is arranged above second exhaust treatment device 14 mounted on first floor portion 41. Of first exhaust treatment device 12 and second exhaust treatment device 14, first exhaust treatment device 12 arranged above is mounted on second floor portion 51. Second floor portion 51 is generally in a shape like a flat plate and extends substantially horizontally. First floor portion 41 and second floor portion 51 extend substantially in parallel to each other. Referring to FIG. 6, second floor portion 51 is arranged at a position higher than top plate 8A of vehicular body cover 8.

A pair of support brackets 52 and 53 are attached to an upper surface of second floor portion 51. Support brackets 52 and 53 are aligned in the longitudinal direction of first exhaust treatment device 12 and arranged at a distance from each other. An attachment instrument 54 is attached to support bracket 52 and an attachment instrument 55 is attached to support bracket 53. For example, a U-bolt is adopted as attachment instruments 54 and 55.

As shown in FIG. 9, first exhaust treatment device 12 is mounted on the pair of support brackets 52 and 53. In this state, attachment instrument 54 substantially in the U shape surrounds the upper surface and the side surface of cylindrical first exhaust treatment device 12 and opposing ends of attachment instrument 54 are fixed to support bracket 52, and attachment instrument 55 substantially in the U shape surrounds the upper surface and the side surface of first exhaust treatment device 12 and opposing ends of attachment instrument 55 are fixed to support bracket 53. First exhaust treatment device 12 is thus carried on second floor portion 51 and supported by second floor portion 51 from below.

Wall members 57 and 58 extend substantially in the upward/downward direction, couple first floor portion 41 and second floor portion 51 to each other, and support second floor portion 51 above first floor portion 41. While second exhaust treatment device 14 is mounted on first floor portion 41, second exhaust treatment device 14 is arranged between wall member 57 and wall member 58, and wall member 57 and wall member 58 are arranged on opposing sides of second exhaust treatment device 14. In lateral direction Y, wall member 57 is arranged on the right of second exhaust treatment device 14 and wall member 58 is arranged on the left of second exhaust treatment device 14. A support structure body for first exhaust treatment device 12 including second floor portion 51 and wall members 57 and 58 is arranged astride second exhaust treatment device 14.

Wall member 58 includes an opposing surface that faces wall member 57 and an opposite surface opposite to the opposing surface. Intermediate pipe support portion 66 is attached to the opposite surface of wall member 58. An attachment instrument 67 is attached to intermediate pipe support portion 66. For example, a U-bolt is adopted as attachment instrument 67.

As shown in FIG. 9, attachment instrument 67 substantially in the U shape surrounds an upper surface, a lower surface, and one side surface of the intermediate pipe and opposing ends of attachment instrument 67 are fixed to intermediate pipe support portion 66 so that intermediate pipe 13 is supported by intermediate pipe support portion 66.

Beam portion 46 is fixed to the upper surface of first floor portion 41. Beam portion 47 is fixed to a lower surface of first floor portion 41. Beam portion 46 extends along fore/aft direction X. Beam portion 46 has a front end fixed to an upper portion of pillar member 61. Beam portion 46 has a rear end fixed to an upper end of pillar member 63. Beam portion 47 extends along lateral direction Y. Beam portion 47 is arranged to extend to the right from beam portion 46 and a left end of beam portion 47 is located below beam portion 46. Beam portion 47 has a right end supported by pillar member 62.

Support frame 40 constructed as such and first exhaust treatment device 12 and second exhaust treatment device 14 that are mounted on support frame 40 are supported from below by three pillar members 61, 62, and 63 shown in FIGS. 7 and 8 and supported on revolution frame 31 with pillar members 61, 62, and 63 being interposed.

Figure 11:
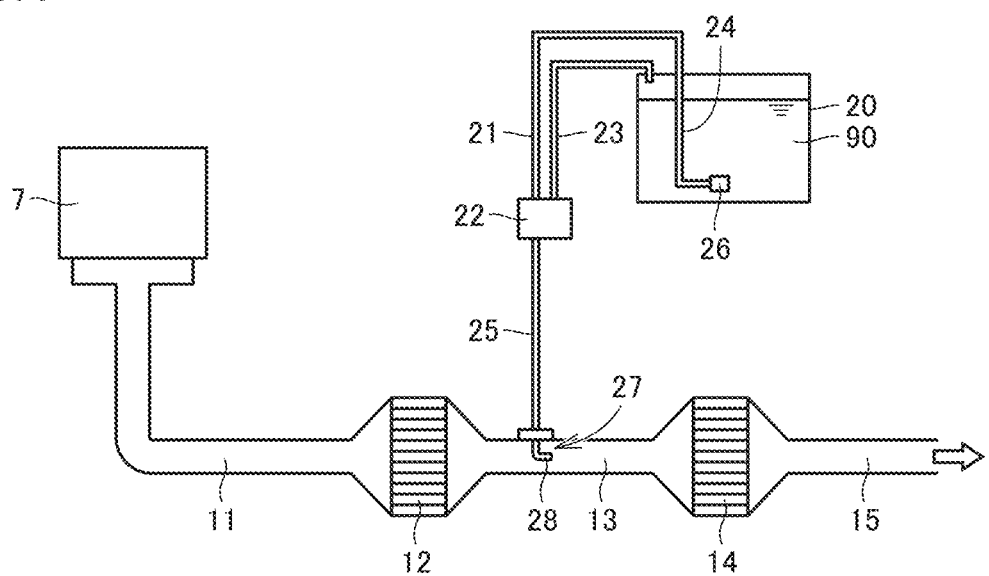
FIG. 11 is a functional view schematically showing a path for a reducing agent and a path for exhaust from an engine.

FIG. 11 is a functional view schematically showing a path for a reducing agent 90 and a path for exhaust from engine 7. As shown in FIG. 11, exhaust emitted from engine 7 is emitted to the atmosphere sequentially through introduction pipe 11, first exhaust treatment device 12, intermediate pipe 13, second exhaust treatment device 14, and exhaust pipe 15. Injector 27 is provided in intermediate pipe 13 on an upstream side of the flow of exhaust with respect to second exhaust treatment device 14. Injector 27 includes an injection nozzle 28.

Reducing agent 90 is stored in a reducing agent tank 20. A suction pipe 24 through which reducing agent 90 flows out of reducing agent tank 20 is arranged in reducing agent tank 20. A strainer 26 is connected to a tip end of suction pipe 24. Suction pipe 24 is coupled to a feed pipe 21. Reducing agent 90 suctioned from reducing agent tank 20 is transferred by a reducing agent pump 22 and reaches injector 27 sequentially through feed pipe 21 and a delivery pipe 25. Reducing agent 90 not used for exhaust treatment returns from reducing agent pump 22 to reducing agent tank 20 through a return pipe 23.

Injector 27 supplies reducing agent 90 suctioned from reducing agent tank 20 to intermediate pipe 13 on the upstream side of exhaust with respect to second exhaust treatment device 14. Through injection nozzle 28, reducing agent 90 is injected into exhaust that flows in intermediate pipe 13. In second exhaust treatment device 14, nitrogen oxide contained in exhaust reacts with reducing agent 90 so that a concentration of nitrogen oxide in exhaust lowers. When a urea solution is employed as reducing agent 90, the urea solution is decomposed in intermediate pipe 13 and converted to ammonia, and as a result of reaction between nitrogen oxide and ammonia, nitrogen oxide is decomposed into harmless nitrogen and oxygen. Exhaust of which amount of nitrogen oxide has lowered to an appropriate value is emitted from exhaust port 16.

Characteristic features and functions and effects of the present embodiment will be summarized as below, although some description may overlap with the description above.

As shown in FIG. 5, the longitudinal direction of first exhaust treatment device 12 shown with axial line L1 is inclined with respect to fore/aft direction X and lateral direction Y of hydraulic excavator 1. In addition, the longitudinal direction of first exhaust treatment device 12 is inclined with respect to the longitudinal direction of second exhaust treatment device 14 shown with axial line L2.

By thus arranging first exhaust treatment device 12 and second exhaust treatment device 14, a plurality of exhaust treatment devices can appropriately be arranged above revolution frame 31 limited in area. In addition, a path of the pipe connected to first exhaust treatment device 12 and second exhaust treatment device 14 can appropriately be set. By appropriately arranging the exhaust treatment devices and the pipe, an area necessary for foothold 8C that serves as a space for maintenance works for engine 7 and first exhaust treatment device 12 can be secured and lowering in workability in maintenance works can be avoided.

As shown in FIG. 5, first exhaust treatment device 12 is arranged above second exhaust treatment device 14, and first exhaust treatment device 12 and second exhaust treatment device 14 intersect with each other in the plan view. By arranging first exhaust treatment device 12 and second exhaust treatment device 14 as being layered in upward/downward direction Z, an area occupied by first exhaust treatment device 12 and second exhaust treatment device 14 is smaller so that a plurality of exhaust treatment devices can appropriately be arranged above revolution frame 31 limited in area.

As shown in FIG. 8, introduction pipe 11 that guides exhaust emitted from engine 7 to first exhaust treatment device 12 passes on the lateral side of second exhaust treatment device 14, extends in the upward/downward direction, and is connected to the lower surface of first exhaust treatment device 12. First exhaust treatment device 12 arranged above second exhaust treatment device 14 is arranged as being inclined with respect to second exhaust treatment device 14 and the longitudinal directions thereof intersect with each other, so that the upper end of introduction pipe 11 that extends in the upward/downward direction can be connected to the lower surface of first exhaust treatment device 12. Since the path of introduction pipe 11 is appropriately set, introduction pipe 11 can be short in length and pressure loss of the flow of exhaust that flows through introduction pipe 11 can be reduced.

As shown in FIG. 9, intermediate pipe 13 that guides exhaust that has passed through first exhaust treatment device 12 to second exhaust treatment device 14 is connected to the lower surface of first exhaust treatment device 12 and to the side surface of second exhaust treatment device 14. First exhaust treatment device 12 arranged above second exhaust treatment device 14 is arranged as being inclined with respect to second exhaust treatment device 14 and the longitudinal directions thereof intersect with each other, so that the upstream end of intermediate pipe 13 can be connected to the lower surface of first exhaust treatment device 12. Intermediate pipe 13 can be arranged along second exhaust treatment device 14 from below the position where it is connected to first exhaust treatment device 12 and the path of intermediate pipe 13 can appropriately be set, so that intermediate pipe 13 can be shorter in length.

As shown in FIG. 6, exhaust pipe 15 through which exhaust that has passed through second exhaust treatment device 14 flows includes exhaust port 16 from which exhaust is emitted to the atmosphere. Exhaust port 16 opens toward the rear of hydraulic excavator 1 on the lateral side of first exhaust treatment device 12. By setting the height position of exhaust port 16 at the upper end of exhaust pipe 15 to be lower than the upper surface of first exhaust treatment device 12, blocking by exhaust pipe 15, of a field of view of an operator who is on board cab 10 can be avoided and viewability in the rear right of hydraulic excavator 1 can be secured.

As shown in FIGS. 2 to 4, first exhaust treatment device 12 is covered with exhaust treatment cover 70. Since first exhaust treatment device 12 can readily be accessed by removal of exhaust treatment cover 70, regular maintenance works for first exhaust treatment device 12 are facilitated. A plurality of ventilating openings 71 to 73 are provided in exhaust treatment cover 70. When a diesel particulate filter device is adopted as first exhaust treatment device 12, particulate matters caught by the filter are burnt to regenerate and hence heat is generated. The plurality of ventilating openings 71 to 73 are provided in exhaust treatment cover 70 that covers first exhaust treatment device 12, so that a space where first exhaust treatment device 12 is accommodated can readily be ventilated and increase in temperature in the space where first exhaust treatment device 12 is accommodated can be suppressed.

As shown in FIG. 5, the rear edge of revolution frame 31 on which engine 7 is supported is formed in an arc shape in the plan view. First exhaust treatment device 12 is arranged such that the longitudinal direction thereof extends along the rear edge of revolution frame 31. By appropriately arranging the plurality of exhaust treatment devices and the pipe, the plurality of exhaust treatment devices can readily be mounted on short tail swing radius hydraulic excavator 1 small in area of revolution frame 31.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 hydraulic excavator; 2 travel unit; 3 revolving unit; 4 work implement; 7 engine; 8 vehicular body cover; 8A top plate; 8B engine hood; 8C foothold; 10 cab; 11 introduction pipe; 12 first exhaust treatment device; 13 intermediate pipe; 13A large-diameter portion; 14 second exhaust treatment device; 15 exhaust pipe; 16 exhaust port; 27 injector; 31 revolution frame; 31C center frame; 31L left side frame; 31R right side frame; 34L, 34R vertical plate; 35 engine mount; 40 support frame; 41 first floor portion; 42, 43, 52, 53 support bracket; 44, 45, 54, 55, 67 attachment instrument; 46, 47 beam portion; 51 second floor portion; 57, 58 wall member; 61, 62, 63 pillar member; 66 intermediate pipe support portion; 70 exhaust treatment cover; 71 to 73 ventilating opening; 75 exhaust opening; 76 canopy portion; L1, L2 axial line

The invention claimed is:

1. A work machine comprising:
an engine;
a first exhaust treatment device that treats exhaust emitted from the engine; and
a second exhaust treatment device that treats exhaust that has passed through the first exhaust treatment device, wherein in a plan view, the first exhaust treatment device intersects with the second exhaust treatment device, and
the first exhaust treatment device is arranged above the second exhaust treatment device.

2. The work machine according to claim 1, further comprising an introduction pipe that guides exhaust emitted from the engine to the first exhaust treatment device, wherein
the introduction pipe passes on a lateral side of the second exhaust treatment device, extends in an upward/downward direction, and is connected to a lower surface of the first exhaust treatment device.

3. The work machine according to claim 1, further comprising an intermediate pipe that guides exhaust that has passed through the first exhaust treatment device to the second exhaust treatment device, wherein
the intermediate pipe is connected to a lower surface of the first exhaust treatment device and to a side surface of the second exhaust treatment device.

4. The work machine according to claim 1, further comprising an exhaust pipe through which exhaust that has passed through the second exhaust treatment device flows, wherein
the exhaust pipe includes an exhaust port from which exhaust is emitted to atmosphere, and
the exhaust port opens toward a rear of the work machine on a lateral side of the first exhaust treatment device.

5. The work machine according to claim 1, further comprising:
an engine compartment where the engine is accommodated; and
a vehicular body cover that covers the engine compartment, wherein
the first exhaust treatment device is arranged above a top plate of the vehicular body cover,
the work machine further comprises an exhaust treatment cover attached to the top plate, the exhaust treatment cover covering the first exhaust treatment device, and
the exhaust treatment cover is provided with a plurality of ventilating openings.

6. The work machine according to claim 1, further comprising a revolution frame that supports the engine, wherein
the revolution frame has a rear edge formed like an arc in the plan view, and
the first exhaust treatment device is arranged such that the longitudinal direction of the first exhaust treatment device extends along the rear edge.

7. A work machine comprising:
an engine;
a first exhaust treatment device that treats exhaust emitted from the engine; and
a second exhaust treatment device that treats exhaust that has passed through the first exhaust treatment device, wherein:
a longitudinal direction of the first exhaust treatment device is inclined with respect to a fore/aft direction and a lateral direction and inclined with respect to a longitudinal direction of the second exhaust treatment device, and
in a plan view, the first exhaust treatment device and the second exhaust treatment device intersect with each other.

* * * * *